US010693929B2

(12) United States Patent
Linshits et al.

(10) Patent No.: US 10,693,929 B2
(45) Date of Patent: Jun. 23, 2020

(54) MODULAR VIDEO BLADE WITH SEPARATE PHYSICAL LAYER MODULE

(71) Applicant: Avid Technology, Inc., Burlington, MA (US)

(72) Inventors: Igor-Yigal Linshits, Kfr-Saba (IL); Allan C. Green, Natick, MA (US)

(73) Assignee: Avid Technology, Inc., Burlington, MA (US)

( * ) Notice: Subject to any disclaimer, the term of this patent is extended or adjusted under 35 U.S.C. 154(b) by 292 days.

(21) Appl. No.: 15/790,369

(22) Filed: Oct. 23, 2017

(65) Prior Publication Data

US 2019/0124129 A1 Apr. 25, 2019

(51) Int. Cl.
*H04L 29/06* (2006.01)
*H04L 29/08* (2006.01)

(52) U.S. Cl.
CPC ............ *H04L 65/60* (2013.01); *H04L 65/602* (2013.01); *H04L 65/607* (2013.01); *H04L 69/323* (2013.01)

(58) Field of Classification Search
CPC ..... H04L 65/60; H04L 65/607; H04L 65/602; H04L 69/323; H04N 21/234327; H04N 21/41407; H04N 21/4516; H04N 21/454; H04N 21/4621; H04N 21/64792; H04N 7/16; H04N 21/226; H04N 21/234; H04N 21/238

See application file for complete search history.

(56) References Cited

U.S. PATENT DOCUMENTS

2005/0076134 A1* 4/2005 Bialik ................ H04N 7/17336
709/230
2008/0049597 A1* 2/2008 Walker ..................... H04L 1/00
370/204

OTHER PUBLICATIONS

HDVGD4 Version 2.0 User's Guide, Orad Hi-Tec Systems, Ltd., Oct. 2015, 38 pages.

* cited by examiner

*Primary Examiner* — Benjamin R Bruckart
*Assistant Examiner* — Tien M Nguyen
(74) *Attorney, Agent, or Firm* — Oliver Strimpel

(57) ABSTRACT

A modular video server includes a Video Blade module and a separate physical layer module. The Video Blade performs video processing functions, such as video encoding and decoding, resizing, slow motion, and color space conversion, and the physical layer module implements the physical layer for input and output of video from devices external to the video server. The modular design permits the type of Video Blade and the type of physical layer module to be specified independently of each other, with each type of Video Blade being compatible with each type of physical layer module. This reduces the effort and cost of providing new video servers that support evolving video processing requirements and new video transmission standards.

6 Claims, 4 Drawing Sheets

MODULAR VIDEO BLADE WITH SEPARATE PHYSICAL LAYER MODULE

BACKGROUND

When designing and implementing video servers, decisions must be made regarding the video processing specifications to be supported and the physical layer implementation. Video processing decisions involve determining the types of video formats and compression standards that need to be supported, the data rates, how video is encoded and decoded, up/down conversion, and other frame, format, or compression-related choices. The physical layer implementation concerns how the video data is transmitted to and received from external devices.

Both decisions on video processing and physical layer implementation may determine the choice of costly components. Once the choices are made and the design for the video server implemented, any changes to the types of video processing, such as codec choice or format support, involve extensive redesign. Further, once the choice for physical layer support is implemented, the subsequent need for a different physical layer standard, such as changing from a SMPTE SDIO coaxial physical layer to a Video Over IP physical layer, necessitates a redesign that could involve extensive signal integrity work, lab testing, standard conformance testing, plug-fest testing, and other standard compliance and interoperability testing.

New design approaches are needed that can accommodate changes in video server requirements to support the proliferation of video processing needs and physical layer standards to lower the design and testing costs, and accelerate new product development.

SUMMARY

In general, the systems and methods described herein include video servers having video processing functions implemented in a module that is separate and distinct from one or more modules that implement the physical layer that communicates with external video devices.

In general, in one aspect, a video server comprises: a first digital video processing module comprising logic for: performing a first set of video processing functions; interfacing to a computer system hosting the video server; and timing and control functions; a first physical layer module in data communication with the first digital video processing module, the first physical layer module being capable of receiving video data from devices external to the video server and transmitting video data to devices external to the video server, wherein the first physical layer module receives and transmits video data according to a first one of a plurality of video transmission standards; and wherein the video server may be configured to receive and transmit video data according to a second one of the plurality of video transmission standards by replacing the first physical layer module with a second physical layer module without replacing the first digital video processing module, wherein the second physical layer module receives and transmits video data according to the second one of the plurality of video transmission standards.

Various embodiments include one or more of the following features. The video server includes one more additional video processing modules and one or more additional physical layer modules, wherein each of the one or more additional video processing modules is in data communication with a corresponding one of the one or more additional physical layer modules. At least one of the one or more additional video processing modules comprises logic for performing a second set of video processing functions, the second set of video processing functions being different from the first set of video processing functions. At least one of the one or more additional physical layer modules receives and transmits video data according to a video transmission standard that is different from the first video transmission standard. The first video processing module is reconfigured in the field to be in data communication with one of the one or more additional physical layer modules instead of being in data communication with the first physical layer module. The video server also includes a second video processing module in data communication with the first video processing module, the second video processing module comprising logic for performing a second set of video processing functions, enabling the video server to perform video processing functions included in at least one of the first set and second set of video processing functions.

In general in another aspect, a video server comprises: a first digital video processing module comprising logic for performing a first set of video processing operations including video encoding and decoding, and video format conversion; a first physical layer module in data communication with the digital video processing module, the physical layer module including logic for transmitting processed video data received from the digital video processing module to devices external to the video server and for receiving video data from devices external to the video server, wherein the first physical layer module receives and transmits video data according to a first one of a plurality of video transmission standards, and the video server is configured by selecting: the first digital video processing module from one of a plurality of types of digital video processing module based on its ability to perform a specified set of video processing functions and support a specified set of video formats; and the first physical layer module from one of a plurality of types of physical layer module based on its ability to transmit and receive video data according to a specified video transmission standard; and wherein the selection of the first digital video processing module is independent of the selection of the first physical layer module, such that the first digital video processing module is compatible with each of the plurality of types of physical layer module and the first physical layer module is compatible with each of the plurality of types of the digital video processing module.

Various embodiments include one or more of the following features. The video further comprises one or more additional video processing modules and one or more additional physical layer modules, wherein each of the one or more additional video processing modules is in data communication with a corresponding one of the one or more additional physical layer modules, and wherein configuring the video server further comprises selecting: each of the one or more additional video processing modules from one of a plurality of types of video processing module; and each of the one or more additional physical layer modules from one of a plurality of types of physical layer module; and the selection of each of the one or more additional video processing modules is independent of and compatible with the selection of its corresponding physical layer module. At least one of the one or more additional video processing modules comprises logic for performing a second set of video programming functions, the second set of video processing functions being different from the first set of video processing functions. At least one of the one or more additional physical layer modules receives and transmits video data according to a video transmission standard that is different from the first video transmission standard. The first video processing module is reconfigured in the field to be in data communication with one of the one or more additional physical layer modules instead of being in data communication with the first physical layer module. The video server further comprises a second video processing module in data communication with the first video processing module, the second video processing module comprising logic for performing a second set of video processing functions, enabling the video server to perform video processing functions included in at least one of the first set and the second set of video processing functions.

In general, in a further aspect, a method of configuring a video server comprising a first digital video processing module and a first physical layer module includes: selecting the first digital video processing module from one of a plurality of types of digital video processing module such that the first digital video processing module is capable of performing a first specified set of video processing functions and supporting a first specified set of video formats; selecting the first physical layer module from one of a plurality of types of physical layer module such that the first physical layer module uses a specified first video transmission standard for: transmitting to external devices digital video data received from the selected digital video processing module; and receiving video data from external devices; and wherein selecting the first digital video processing module is independent of selecting the first physical layer module, such that each of the plurality of types of digital video processing module is compatible with each of the plurality of types of physical layer module.

Various embodiments include one or more of the following features. The video server further comprises one or more digital video processing modules in addition to the first digital video processing module and one or more physical layer modules additional to the first physical layer module, wherein each of the one or more additional digital video processing modules is in data communication with a corresponding one of the one or more additional physical layer modules, and wherein the method of configuring the video server further comprises: selecting each of the one or more additional digital video processing modules from one of a plurality of types of digital video processing module; and selecting each of the one or more additional physical layer modules from one of a plurality of types of physical layer modules. At least one of the selected one or more additional digital video processing modules comprises logic for performing a second set of video programming functions, the second set of video processing functions being different from the first set of video processing functions. At least one of the selected one or more additional physical layer modules receives and transmits video data according to a video transmission standard that is different from the first video transmission standard. The further comprises reconfiguring the first digital video processing module in the field to be in data communication with one of the additional physical layer modules instead of being in data communication with the first physical layer module. The video server further comprises a second digital video processing module in data communication with the first digital video processing module, further comprising: selecting the second digital video processing module from one of a plurality of types of video processing module such that the second digital video processing module is capable of performing a second specified set of video processing functions and supporting a second specified set of video formats; and wherein the video server is capable of: performing video processing functions included in at least one of the first set and the second set of video processing functions; and supporting video formats included in at least one of the first set and the second set of supported video formats. The first set of video processing functions is different from the second set of video processing functions. The first set of supported video formats is different from the second set of supported video formats.

DETAILED DESCRIPTION

Video servers are computer-based devices that are used for delivering and receiving video. They record and store incoming video, and play out one or more video streams that adhere to video transmission standards. Broadcast quality video servers store hundreds or more hours of video and audio, usually compressed using various codecs. When playing out video, a video server retrieves the video from storage in digital form, performs any required digital processing of the video, and puts the processed video into a standard form that can be output for transmission to external devices. When ingesting video from external sources, such as a video camera, a satellite data feed, a disk drive, or another video server, the incoming video is converted into digital form, and may be processed, e.g., compressed, before being stored.

The video server described herein splits the video processing functions and the physical layer implementation into two independent modules. A Video Blade performs the video processing and a physical layer module, referred to herein as the Phy Module, performs the physical layer implementation. The full separation of functions into two independent modules within the video server addresses the inflexibility and costly redesign associated with current all-in-one systems, allowing for fast and less expensive implementation of video servers that support multiple formats, codecs, and IO standards. Various implementations of such a video server contain a plurality of Video Blades, each of which is connected to a Phy Module. There are multiple types of Phy Module, each type corresponding to a particular physical layer interface. For example, one type of Phy Module provides for SDIO and another type supports Video Over IP. A first Video Blade may be connected to a SDIO Phy Module and a second Video Blade may be connected to a Video Over IP Phy Module. A video server may contain a plurality of different types of Video Blade that support different standards (e.g., different codecs, or different video formats) and each Video Blade may be connected to any type of Phy Module.

Figure 1:
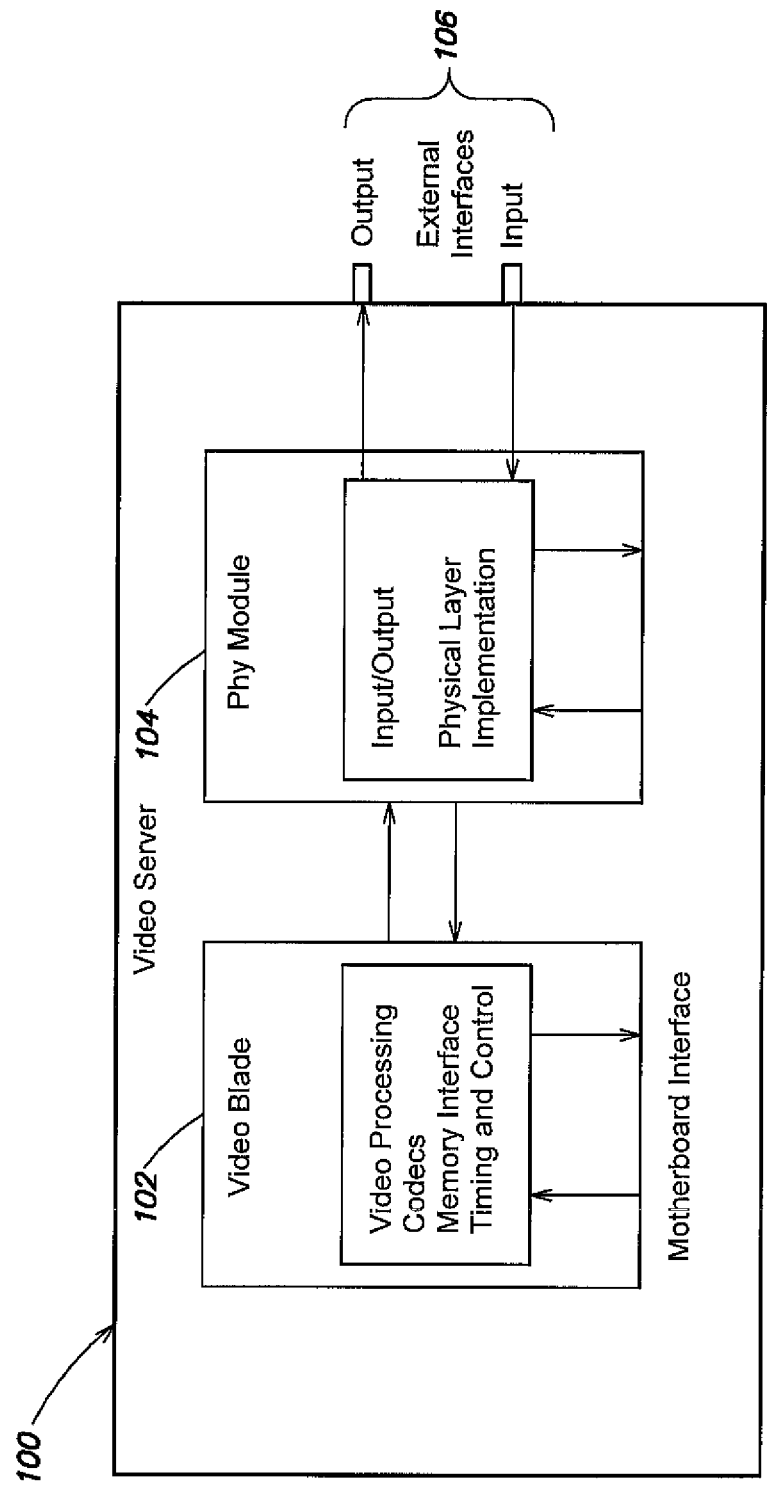
FIG. 1 is a high-level block diagram of a video server comprising a video processing module and a separate physical layer implementation module.

FIG. 1 is a high-level block diagram illustrating an implementation of a video server using a separate Video Blade module and Phy Module. Video Server 100 includes Video Blade module 102 and Phy Module 104. Functions performed by the Video Blade include but are not limited to video processing, interfacing with the system hosting the video server, and timing and control. The hosting system may be a system running the Linux operating system, the Windows operating system or another operating system, and the interface between the Video Blade and the host system may be a generic interface, such as a PCIe interface. The video processing functions include but are not limited to: encoding (intraframe or long GOP compression), decoding, resizing (up-convert, down-convert), slow motion, picture-in-picture, image blending, look-up-table for 2-D or 3-D, color space conversion, and aspect ratio resizing. Video Blade 102 is connected to the motherboard of the video server by means of a parallel bus, such as PCIe bus. Digital video to be processed enters the Video Blade via this interface. Similarly, when the video server is receiving video, it is output via the PCIe interface for further handling and/or storage by the video server.

When the video server is playing out video, Phy Module 104 receives various video formats, such as SD, HD, UHD at different video rasters such as 1080i, 1080p, 720p, over a common Video Blade to Phy Module interface. This interface is a custom digital high speed differential two-way data path with separate control/status path that can be implemented in various ways. The common features of the interface include a two-way data plane, control plane, and power. The data and control are generally in digital form, and power comes from a standard 4-pin disk power connector. Phy Module 104 receives processed video from Video Blade 102 encoded in any one of the various video formats. The Phy Module converts the video into a physical layer video signal in accordance with a particular I/O standard for video transmission. The converted video is then output and sent to external devices via external interfaces 106. Conversely, when the video server is ingesting video material, the video is received from an external device via the external interface input, and converted into the digital format supported by the Video Blade, and output to the Video Blade.

Each of the Video Blade and the Phy Module employ a standard hardware interface that plugs into the video server motherboard, which facilitates the ability to configure a video server with any combination of Video Blade type and Phy Module type. During setup of a video server for each combination of Video Blade type and Phy Module type, setup software is run to configure the Video Blade to operate correctly with the Phy Module. This discovers the installed Video Blade, and through the Video Blade, discovers the Phy Module and its capabilities. Referring to a configuration file, the video server software initializes and configures each Video Blade and Phy Module with the correct format, frame rate, and other selectable parameters that are supported by their capabilities.

Figure 2:
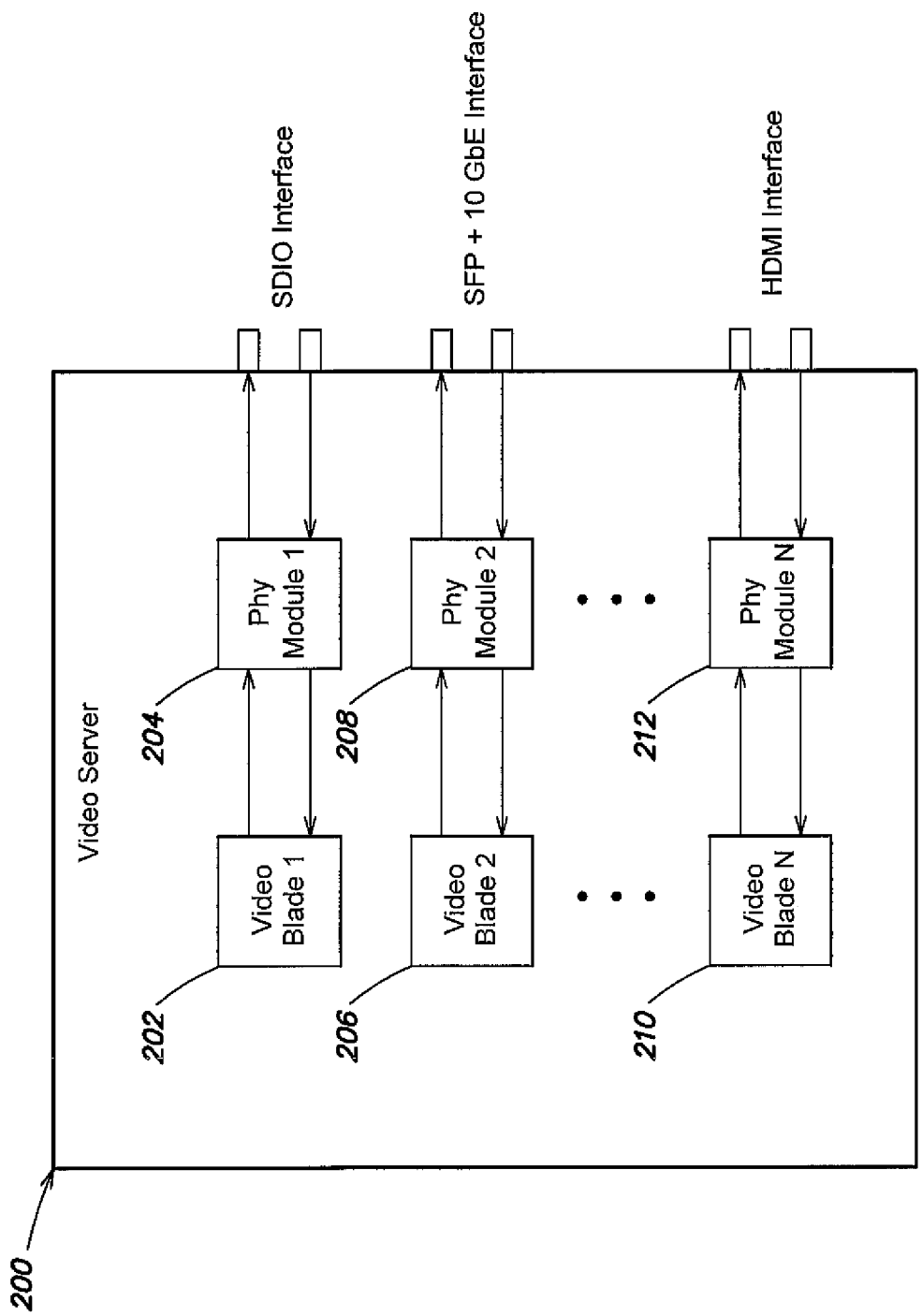
FIG. 2 illustrates a multi-channel video server that includes a plurality of video interfaces for external devices implemented with separate video processing modules and physical layer implementation modules.

FIG. 2 illustrates a multi-channel realization of video server 200 that includes a plurality of video IO functions implemented with a separated Video Blade and Phy Module design. In the configuration illustrated, Video Blade 1 202 is paired with Phy Module 1 204 supporting an SDIO physical layer interface, Video Blade 2 206 is paired with Phy Module 2 208 supporting an SFP+10 GbE interface, and Video Blade N 210 is paired with Phy Module N 212 supporting a HDMI interface. Video Blades 1, 2, through N may be of the same type, i.e., supporting the same processing functions, or they may be of different types to support different processing functions. Similarly, Phy Modules 1, 2, through N may support the same or different external interfaces. Such a configuration would be incorporated into a multi-channel video server that supports multiple video formats, codecs, and standards, and that interfaces with any type of external video device. Typically, all the Video Blades would be connected to a single motherboard.

Figure 3:
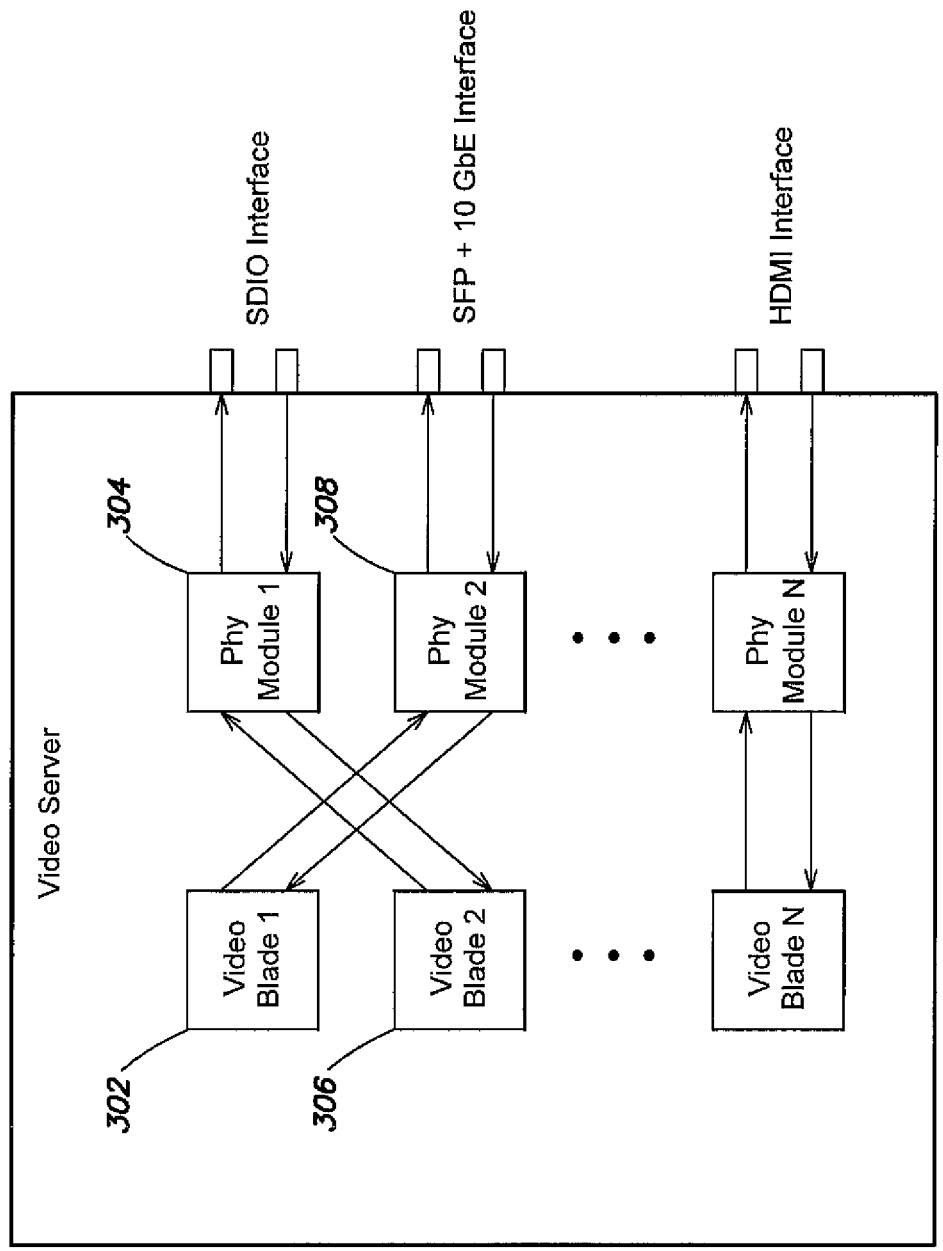
FIG. 3 illustrates the multi-channel video server of FIG. 2 with a reconfigured pairing between video processing modules and physical layer modules.

The modular video server design described herein also permits flexible reconfiguration in the field. For example, the multi-channel video server illustrated in FIG. 2 may be modified by an end user as shown in FIG. 3 to reroute Video Blade 2 306 to the SDIO Interface Phy Module 1 304 and Video Blade 1 302 to the SFP+10 GbE Interface Phy Module 2 308. Such a modification would be required to align a different format, codec, or standard to Phy Module 1 for interfacing to external devices via the SDIO Interface. Current video server designs with integrated processing and physical layer implementation do not provide the flexibility needed to perform such changes in the field.

Figure 4:
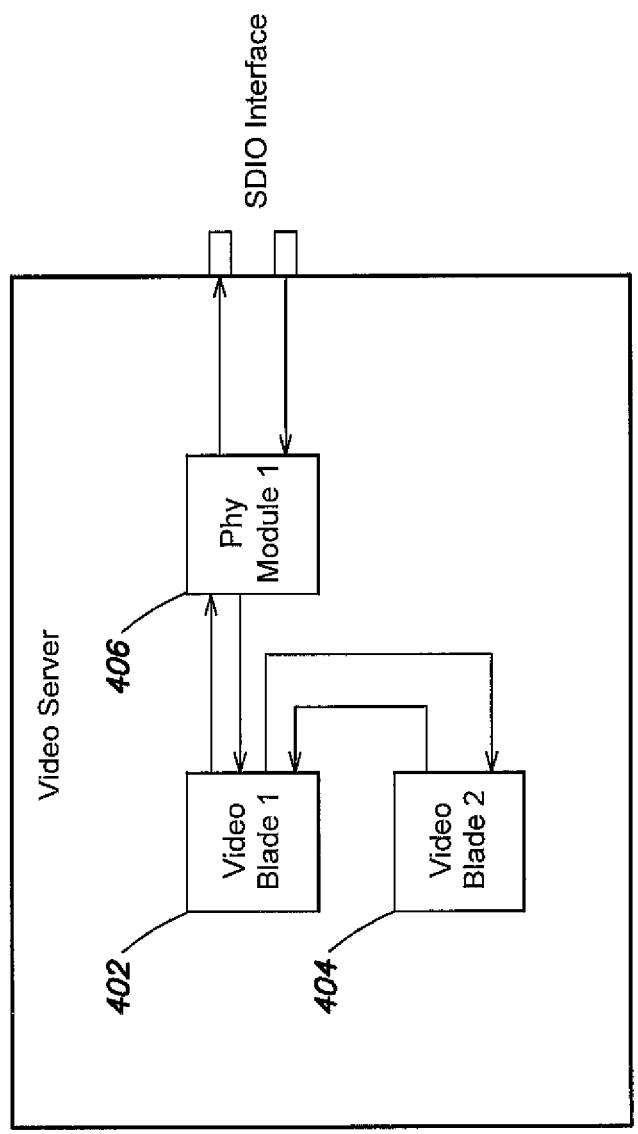
FIG. 4 illustrates a video server comprising two video processing modules and a single physical layer implementation module.

FIG. 4 illustrates a video server embodiment with multiple Video Blades 402 and 404 and single Phy Module 406. Each of the Video Blades is connected to the video server motherboard using, for example, a PCIe interface. The interface that connects the Video Blade to the Phy Module can also be used for communication between video blades. As illustrated in FIG. 4, Video Blade 2 is connected to Video Blade 1, but not to a Phy Module. Video Blade 1 is connected to Phy Module 1. This configuration is useful for cascading video processing functions, such as layering or graphics. In one example of a use case, Video Blade 2 receives the "Head and Shoulders" compressed video of a news program from the motherboard of the video server, decompresses and formats the video, and passes this to Video Blade 1 over the Blade-Blade interface. Then Video Blade 1 receives other compressed video from the motherboard of the Video Server, decompresses and formats the video, and combines it with the Video Blade 2 video to form a composite video image, such as picture-in-picture, or side-by-side. In another example, Video Blade 1 receives graphical images such as "crawlers" or titles, or sidebars from the Video Server motherboard and adds those to the Video from Video Blade 2 forming a composite video stream.

Having two Video Blades may also be used to perform complicated video processing, e.g., special effects, that requires more processing power than a single Blade can supply. Another use for this configuration arises when there is PCIe bus congestion on the motherboard, and the Blade to Blade side channel serves to remove traffic from the main bus, thus relieving the congestion. A further use of the two-Blade configuration includes channel linking for multi-channel encoding or decoding required by interleaved pixel formats.

The various components of the video server described herein may be implemented using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism. The processor is in data communication with various components via a parallel data bus. Modules can be connected to the bus via standard connections. The modules include the video processing modules and the physical layer modules described above, and may include other modules that supply memory, processing, input/output, or other functions.

One or more output devices may be connected to the computer system. Example output devices include, but are not limited to, liquid crystal displays (LCD), plasma displays, various stereoscopic displays, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in hardware, firmware, or a combination of the two. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A video server comprising:
   a first digital video processing module comprising first computer program instructions executed on a first processor to perform a first set of video processing operations including video encoding and decoding, and video format conversion, and having a first interface;
   a second digital video processing module, comprising second computer program instructions executed on a second processor to perform a second set of video processing operations including video encoding, video decoding, and video format conversion, and having a second interface;
   a first physical layer module having a first internal interface and a first physical layer interface and comprising third computer program instructions executed on a third processor to transmit processed video data received over the first internal interface from one of the first and second digital video processing modules to devices external to the video server over the first physical layer interface and to receive video data from devices external to the video server over the first physical layer interface and to provide the received video data to one of the first and second digital video processing modules over the first internal interface;
   a second physical layer module having a second internal interface and a second physical layer interface and comprising fourth computer program instructions executed on a fourth processor to transmit processed video data received over the second internal interface from one of the first and second digital video processing modules to devices external to the video server over the second physical layer interface and to receive video data from devices external to the video server over the second physical layer interface and to provide the received video data to one of the first and second digital video processing modules over the second internal interface; and
   a configuration file;
   wherein the first interface, the second interface, the first internal interface, and the second internal interface are configured using the configuration file and implement a common physical and electrical interface; and
   wherein:
   when the first interface of the first digital video processing module is configured to be directly connected to the first internal interface of the first physical layer module, the first physical layer module communicates data between the first digital video processing module and the devices external to the video server connected using the first physical layer interface;
   when the first interface of the first digital video processing module is configured to be directly connected to the second internal interface of the second physical layer module, the second physical layer module communicates data between the first digital video processing module and the devices external to the video server connected using the second physical layer interface;
   when the second interface of the second digital video processing module is configured to be directly connected to the first internal interface of the first physical layer module, the first physical layer module communicates data between the second digital video processing module and the devices external to the video server connected using the first physical layer interface; and when the second interface of the second digital video processing module is configured to be directly connected to the second internal interface of the second physical layer module, the second physical layer module communicates data between the second digital video processing module and the devices external to the video server connected using the second physical layer interface.

2. The video server of claim 1, wherein the common interface comprises a two-way data plane, a control plane, and power.

3. The video server of claim 1, wherein the first physical layer interface comprises one of a SMPTE SDIO coaxial physical layer, a video over IP physical layer, HDMI, and SFP+10 GbE.

4. The video server of claim 1, wherein the second set of video processing functions comprises functions different from the first set of video processing functions.

5. The video server of claim 1, further comprising a mother board connected to each of the digital video processing modules that configures the digital video processing modules and physical layer modules when the digital video processing modules and the physical layer modules are interconnected.

6. A video server comprising:
a first digital video processing device that performs a first set of video processing operations including video encoding, video decoding, and video format conversion, and having a first interface;
a second digital video processing device that performs a second set of video processing operations including video encoding, video decoding, and video format conversion, and having a second interface;
   a first physical layer device that transmits processed video data received over a first internal interface from one of the first and second digital video processing devices to devices external to the video server over a first physical layer interface and that receives video data from devices external to the video server over the first physical layer interface;
   a second physical layer device that transmits processed video data received over a second internal interface from one of the first and second digital video processing devices to devices external to the video server over a second physical layer interface and that receives video data from devices external to the video server over the second physical layer interface; and
a configuration file;
wherein the first interface, the second interface, the first internal interface, and the second internal interface are configured using the configuration file and implement a common physical and electrical interface; and wherein:
when the first interface of the first digital video processing device is configured to be directly connected to the first internal interface of the first physical layer device, the first physical layer device communicates data between the first digital video processing device and the devices external to the video server connected using the first physical layer interface;
when the first interface of the first digital video processing device is configured to be directly connected to the second internal interface of the second physical layer device, the second physical layer device communicates data between the first digital video processing device and the devices external to the video server connected using the second physical layer interface;
when the second interface of the second digital video processing device is configured to be directly connected to the first internal interface of the first physical layer device, the first physical layer device communicates data between the second digital video processing device and the devices external to the video server connected using the first physical layer interface; and
when the second interface of the second digital video processing device is configured to be directly connected to the second internal interface of the second physical layer device, the second physical layer device communicates data between the second digital video processing device and the devices external to the video server connected using the second physical layer interface.

\* \* \* \* \*